(12) United States Patent
Armstrong et al.

(10) Patent No.: US 6,186,116 B1
(45) Date of Patent: Feb. 13, 2001

(54) METHOD FOR SETTING TORQUE IN AN INTERNAL COMBUSTION ENGINE

(75) Inventors: Neil Armstrong; Hans Braun, both of Stuttgart; Matthias Scherer, Esslingen, all of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/362,741

(22) Filed: Jul. 29, 1999

(30) Foreign Application Priority Data

Jul. 29, 1998 (DE) .............................................. 198 34 137

(51) Int. Cl.$^7$ ...................................................... F02D 41/14
(52) U.S. Cl. ............................................. 123/350; 123/494
(58) Field of Search ..................................... 123/494, 672, 123/674, 681, 683, 704, 350, 349; 701/103, 109, 104

(56) References Cited

U.S. PATENT DOCUMENTS

| | | | |
|---|---|---|---|
| 4,691,675 | * | 9/1987 | Iwaki ..................................... 123/399 |
| 5,073,865 | * | 12/1991 | Togai et al. ...................... 364/431.05 |
| 5,282,449 | * | 2/1994 | Takahashi et al. ..................... 123/350 |
| 5,293,852 | * | 3/1994 | Lehner et al. ......................... 123/339 |
| 5,467,750 | * | 11/1995 | Braun et al. ........................... 123/350 |
| 5,666,918 | * | 9/1997 | Pallett et al. ........................... 123/350 |
| 5,832,895 | * | 11/1998 | Takahashi et al. .................... 123/350 |
| 5,987,372 | * | 11/1999 | Wolf et al. .............................. 701/69 |

FOREIGN PATENT DOCUMENTS

| | | |
|---|---|---|
| 3926031 C1 | 8/1989 | (DE) . |
| 4029537 A1 | 3/1992 | (DE) . |
| 4315885 C1 | 5/1993 | (DE) . |
| 4304633 A1 | 8/1994 | (DE) . |
| 19648159 A1 | 6/1997 | (DE) . |

* cited by examiner

*Primary Examiner*—Henry C. Yuen
*Assistant Examiner*—Arnold Castro
(74) *Attorney, Agent, or Firm*—Evenson, McKeown, Edwards & Lenahan, P.L.L.C.

(57) ABSTRACT

A method for setting the torque in an internal combustion engine determines a set air mass and a corresponding throttle valve setting from a set torque in a control tract. An actual air mass allows the difference between a set air mass and the actual air mass to be determined by comparing a set value and the actual value. The controlling effort for setting a desired torque will be reduced. A correction value for the difference between the actual and set values of the air mass is calculated whereby an adaptation of the control tract to the difference is performed. Thereby, in the control tract, a correspondingly adapted throttle valve position will then be associated with a set torque that is to be established. A compensation of the previously determined difference between the set value and the actual value of the air mass is produced. An actual fuel mass fed to the combustion chambers can be utilized for determining the actual air mass, as can a fuel/air mass ratio of a mixture fed to the combustion chambers.

17 Claims, 2 Drawing Sheets

METHOD FOR SETTING TORQUE IN AN INTERNAL COMBUSTION ENGINE

BACKGROUND OF THE INVENTION

This application claims the priority of 198 34 137.7-26, filed Jul. 29, 1998, the disclosure of which is expressly incorporated by reference herein.

The present invention relates to a method for setting a specific torque in an internal combustion engine.

In order to achieve a specific motor vehicle driving performance desired, for example, by the driver or set by an electronic motor controller, a very quick and precise establishment of a specific set starting torque (set torque) of an internal combustion engine of the vehicle is necessary. To set the desired torque, first a rate of air flow or mass of air is usually determined which has to be delivered to the internal combustion engine in order to achieve the desired set torque. For a throttle valve situated in an air induction tract, by which the air mass fed to the internal combustion engine can be adjusted, a throttle valve angle is determined from the air mass value and is set at the throttle valve by an appropriate adjusting device.

Because flow processes are involved in the feed of air and fuel to combustion chambers in an internal combustion engine, the term "mass" is used herein to always mean a mass flow, i.e., a mass per unit time. In particular, internal combustion engines which operate by the Otto principle are usually fed air, i.e., the amount of fuel fed for combustion is governed by the amount of air fed for combustion. For this purpose such an internal combustion engine has an air mass sensor by which the air mass fed for combustion is measured in order to feed the internal combustion engine an amount of fuel adapted thereto, for example by a fuel injection system.

The determination of a throttle valve angle from an air mass is usually performed through association with a performance graph, in accordance with, for example, the rotary speed of the internal combustion engine. This association of a torque with an air mass and of an air mass with a throttle valve angle is referred to as a control tract.

As especially the actual conditions in which the internal combustion engine chambers operates are different from the marginal conditions under which such performance graphs were recorded during testing, the air mass actually fed to the combustion chambers often differs from the air mass needed in order to achieve the desired set torque, so that the actual torque differs from the required set torque. To remedy this situation, various control processes are known in which a comparison of the set torque and actual torque is performed. On the basis of the difference thus determined between the set air mass and the actual air mass the throttle valve angle is then adjusted. This comparison followed by adjustment is continued in the sense of a regulation until the actual air mass is the same as the set air mass.

DE 43 15 885 C1 describes a method for torque adjustment in which, based on a set torque, a mass stream set value for the air to be delivered to the combustion chambers and the actual measured value is adjusted to the particular set value by adjusting the throttle valve opening angle. The particular set value is determined by an air mass sensor which is located upstream from a throttle valve in an air induction tube of the internal combustion engine.

The operation of a motor vehicle must, as a rule, be adapted to constantly changing marginal conditions; especially, new values must constantly be set for another necessary set torque. Thus, the need for control to make the actual air mass equal to the set air mass is very great, and therefore an intensive regulation of the throttle valve angle usually is performed constantly. Consequently, very great stress is applied to the throttle valve and the corresponding throttle valve adjusting device. Furthermore, the adjustment of the desired set air mass takes time, and regularly so much time that the desired set air mass changes again between times. Therefore, the throttle valve angle change regularly lags behind the desired set air mass.

Furthermore, the adjustment of a desired set torque depends primarily on the correctness of the reading of the actual air mass. The air mass sensors usually used in determining the air mass are, however, exposed to aging and to contamination, so that the actual air masses that are read differ increasingly over the course of time from the actual air mass. Moreover, fatigue phenomena or the like may induce leakage and other problems in the air intake tract, causing the actually measured air mass to differ from the air mass actually delivered to the internal combustion engine for combustion.

SUMMARY OF THE INVENTION

An object of the present invention is to provide a method for torque adjustment such that the air mass can be determined with virtually constant accuracy, while especially the cost of the controls for establishing a set torque can be reduced.

This object has been achieved according to the invention by providing a method in which a control tract is provided in which a correlation of a torque with an air mass and of an air mass with a throttle valve position is performed, wherein a set air mass is determined by means of the control tract from a set torque and a corresponding throttle valve position is determined and set. An actual air mass fed to the internal combustion engine for combustion is determined by comparing the set and actual air mass value. Any difference between the set air mass and the actual air mass is determined, along with a correlation value for this difference. The correlation value is used to perform an adaptation of the control tract to the difference such that in the control tract a throttle valve position is associated with a set torque that is to be established which brings about a compensation of the previously determined difference between the set air mass and the actual air mass, in order to determine the actual air mass an actual fuel mass fed to the internal combustion engine for combustion is used as well as a fuel/air mass ratio of a mixture fed to the internal combustion engine for combustion.

The present invention is based on the recognition of adaptively correcting the relationship between the throttle valve angle and the desired set air mass by comparison with the actual air mass delivered for combustion. The adaptation of the control tract can be performed by multiplication or addition. This adaptation acts continuously until another adaptation is performed. If then a set torque follows the adapted control tract, a corrected throttle valve angle is immediately associated with the corresponding set air mass. Therefrom, an actual air mass regularly results which from the outset, i.e., still without any regulation, is closer to the desired set air mass than would be the case if the throttle valve angle were to be determined from the unchanged, i.e., unadapted, control tract. Consequently, the need for regulation is reduced to a considerable extent by this measure, so that the mechanical stress on the components in question is reduced. Furthermore, the desired set value of the air mass and torque is arrived at much more quickly, so that the desired performance of the vehicle can be quickly established.

In order to be independent of aging phenomena, changes in the air intake flow and leakage in the air intake tract, the set air mass actually fed to the combustion is determined according to the fuel/air mass ratio of the mixture fed to the combustion and to the fuel mass contained in this mixture.

Since modern internal combustion engines are equipped, as a rule, with a fuel injection system, in an advantageous embodiment of the method of the invention, the fuel mass is determined with the aid of operating parameters, especially with the aid of the duration of the injection and/or the injection pressure of such a fuel injection system. In this manner, a method of the present invention can employ a sensing system already present in the internal combustion engine, so that no additional costs and no additional weight are required.

An internal combustion engine is usually designed for the use only of a specific type of fuel, such as super lead-free and lead-free gasoline. Consequently, the ratio between fuel mass and air mass for stoichiometric combustion in the internal combustion engine is known. Therefore the fuel-air mass ratio can also be determined by the stoichiometry of the combustion, which is usually referred to as the $\lambda$ value (e.g., if $\lambda=1$, the combustion is stoichiometric), and a conventional $\lambda$ probe can be used to determine the $\lambda$ value.

According to an embodiment of the method of the invention, the fuel/air mass ratio of the mixture can therefore be determined from signals from a sensor, preferably arranged in the exhaust gas tract of the internal combustion engine, especially a $\lambda$ probe, which determines the composition of gases exhausted from the internal combustion engine. A $\lambda$ probe is already present in the exhaust tract in many vehicles. The $\lambda$ probe serves there to analyze the exhaust composition in order, for example, to achieve especially low pollutant levels. If, however, the exhaust composition is known, the fuel/air mass ratio can also be stated.

In vehicles which have a $\lambda$ control to reduce pollutant emissions, a setting for the injection system is determined from the fuel/air mass ratio detected through the $\lambda$ probe, so as to set or correct the $\lambda$ value of the exhaust gases to a desired level. Therefore, for the practice of the method of the invention, recourse can be taken to apparatus already present in the vehicle, e.g., a $\lambda$ control system and a $\lambda$ probe. Here too there are no additional costs or additional weight involved.

According to an expedient embodiment of the method of the invention, an internal combustion engine which is already equipped with a conventional air mass sensor in the intake tract, compares the air mass measured by this air mass sensor with the air mass determined from the fuel/air mass ratio and from the fuel mass. Any differences found can then be utilized for the diagnosis of the air intake tract and/or the air mass sensor. In the method of the invention, the actual air mass which is used for comparison of the set and actual air mass can be determined directly or indirectly with the aid of the fuel mass and the fuel/air mass ratio of the mixture.

In a preferred embodiment of the method of the invention, the actual air mass is determined directly, and then an actual air mass value is calculated from the fuel mass and the fuel/air mass ratio which represents the actual air mass for the comparison of the actual air mass to the set air mass. In such an embodiment, a conventional air mass sensor for the purposes of adapting the control tract can be completely eliminated.

In a contrasting alternative embodiment, the actual air mass can be determined indirectly, in which, to determine the actual air mass, first an air mass value is measured with an air mass sensor, secondly a reference air mass value is computed from the fuel mass and the fuel-air mass ratio, thirdly the measured air mass value, is corrected with the aid of the computed reference air mass value and fourthly an actual air mass value is formed which represents the actual air mass for the comparison of the actual and set values of the air masses. This embodiment can be linked very simply to apparatus already present for adjusting a torque or can cooperate therewith. Also, thereby, the signal from the air mass sensor can already be adapted to aging and contamination phenomena at the sensor end. This is a considerable advantage especially in air-fed internal combustion engines, because the fuel mass fed to the combustion depends in air-fed internal combustion engines on the air mass measured at the air mass sensor and only indirectly on the throttle valve attitude. A faulty air mass sensor will then result in an erroneous fuel mass measurement, so that the desired set torque cannot be achieved with regulation.

An equalization and calibration of the air mass sensor can be performed. With the, especially continually working, correction of the signal value of the air mass sensor, the fuel mass to be provided for this air mass is found. Then again a regulation on the basis of the air mass sensor can be performed in order to set the desired torque.

In an internal combustion engine with $\lambda$ regulation, the fuel delivery is influenced, as described above, by the composition of the exhaust gas, until a desired exhaust composition has been set. If on account of a faulty air mass sensor an unsuitable fuel mass is delivered for combustion from the very outset, the effort required by this $\lambda$ control is high. With the equalization of the air mass sensor provided by the invention, the fuel injection carried by the air to the combustion chambers leads from the outset to a combustion which substantially results in the desired exhaust gas composition, so that the effort required of the $\lambda$ control can be considerably reduced and the life of the involved components increased.

According to an especially advantageous embodiment of the method of the invention, the determination of the set air mass forming the basis of the comparison of the set and actual air mass values is performed only if the internal combustion engine is in a steady or quasi-steady state of operation. In such a state of operation, especially sufficient time is available for setting up the desired set values for, for example, the exhaust composition, the fuel mass and also for the torque. Thus the actual air mass detected is very accurate, so that the adaptation of the control tract can be performed just as accurately. Consequently, especially the control effort for other subsequent states of operation is decidedly reduced, and in general the operation of the internal combustion engine is improved.

According to a currently preferred embodiment of the method of the invention, a determination of the actual air mass can be performed when the combustion of the mixture fed to the internal combustion engine is stoichiometric, since in this state a thoroughly precise calculation of the air mass from the fuel mass is easily performed.

BRIEF DESCRIPTION OF THE DRAWINGS

Other objects, advantages and novel features of the present invention will become apparent from the following detailed description of the invention when considered in conjunction with the accompanying drawings.

FIG. 1b is a schematic diagram of an engine system which uses the method shown in FIG. 1a.

DETAILED DESCRIPTION OF THE DRAWINGS

Figure 1A:
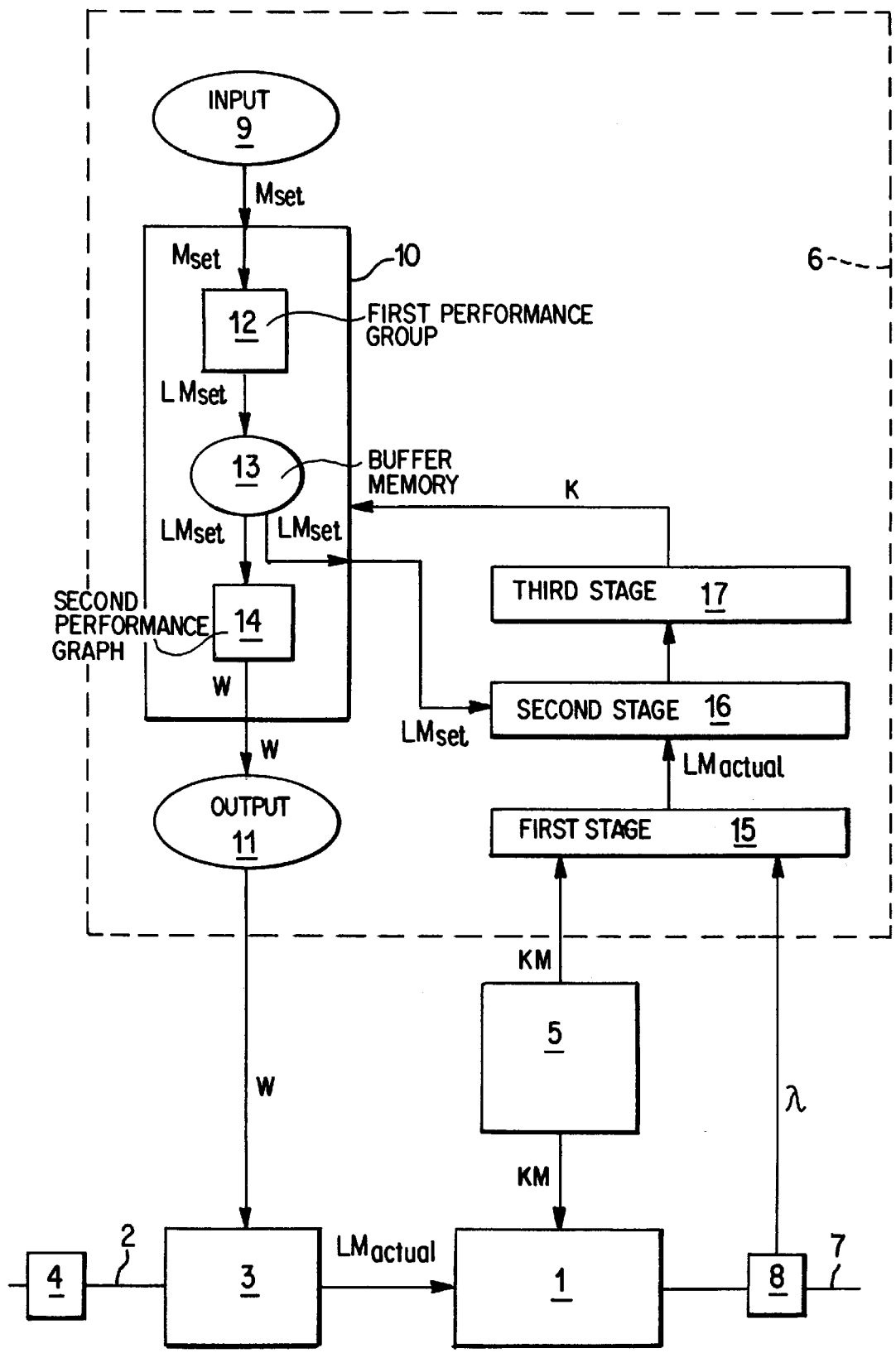
FIG. 1a is a schematic flow diagram of an internal combustion engine which is operated by the method of the present invention.
Figure 1B:
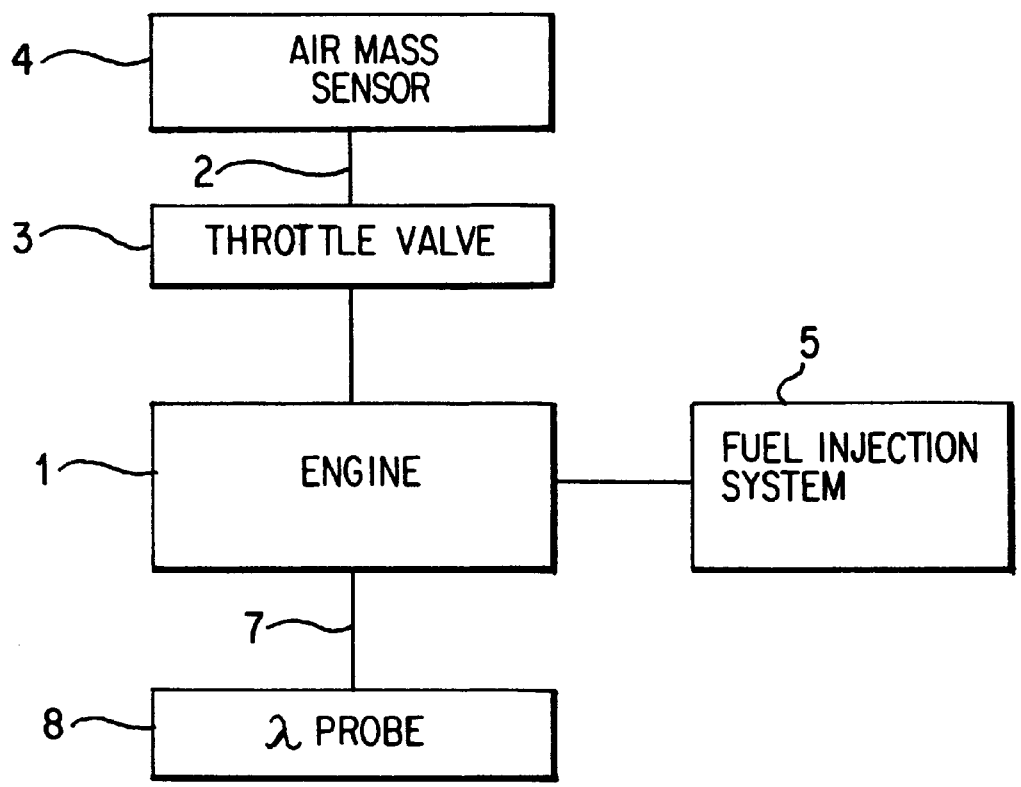

An internal combustion engine 1 aspirates air through an air induction tract 2 for combustion. A throttle valve 3 is provided in the air induction tract 2 to control the amount of air or air mass LM flowing through the tract 2. Ahead of the throttle valve 3, an air mass sensor 4 is disposed in the air induction tract 2 whereby the air mass LM fed to the internal combustion engine 1 can be measured in a conventional manner. In an air-fed internal combustion engine 1, a fuel mass KM is determined in accordance with the air mass detected by the air mass sensor 4 and is communicated to a fuel injection system 5 in the form of a corresponding signal. Any reference to a physical magnitude above or below always also refers to the signal value correlated therewith.

The fuel injection system 5 then feeds to the internal combustion engine 1 the determined fuel mass KM. The determination of the necessary fuel mass KM is usually performed in an electronic motor controller 6 in which the necessary apparatus, such as a computer, memory and the like, are contained (not shown). The signal lines and the like required in this regard are omitted from the drawing-figure for the sake of clarity. An exhaust tract 7 is connected downstream from the internal combustion engine 1 in which a sensor 8 is present for determining the exhaust gas composition. Such a sensor 8 is usually a $\lambda$ probe by which the composition of the exhaust gas and hence the stoichiometric value or $\lambda$ value of the mixture of air and fuel fed to the internal combustion engine 1 can be determined. Such a $\lambda$ probe 8 is usually used in connection with an exhaust cleaning apparatus disposed in the exhaust tract 7 but not shown.

The pollutant emission levels of the internal combustion engine 1 are especially favorable if the gases fed to the exhaust cleaning system have a predetermined composition, i.e., a predetermined $\lambda$ value. The composition of the exhaust gases depends directly on the composition of the mixture fed for combustion, so that a modern exhaust gas cleaning system usually has a so-called $\lambda$ control by which the composition of the mixture fed for combustion, and thus indirectly the composition of the exhaust gases, can be adjusted to the predetermined $\lambda$ value. For this purpose the $\lambda$ control in an air-fed internal combustion engine 1 influences the fuel mass KM fed to the combustion chambers in order thereby to vary the composition of the mixture. The apparatus necessary for the purpose are usually housed in the motor controller 6', and the corresponding control lines and the like are not shown for the sake of simplicity.

Due to a driver's action or to the requirements of electronic systems for affecting the driving properties of a vehicle equipped with the internal combustion engine 1, the motor controller 6 is given a set torque $M_{set}$ which for this purpose is communicated in the form of a corresponding signal value to an input 9 of the motor controller 6. In the motor controller 6 the set torque $M_{set}$, i.e., a signal correlated therewith, is fed to a control tract 10 in which a throttle valve angle W is associated with the set torque and is then forwarded from the control tract 10 to an output 11 of the motor controller 6 in the form of a corresponding signal value.

For the association of the set torque with a specific throttle valve angle, a first performance graph is provided in the control tract 10 and includes an air mass LM necessary to produce the set torque associated with an incoming torque, for example one depending on the actual rotary speed of the internal combustion engine 1. Accordingly, a set air mass $LM_{set}$ is associated with the set torque $M_{set}$ entered in the first performance graph and is deposited in a buffer memory 13. The buffer memory 13 then passes the set air mass $LM_{set}$ to a second performance graph 14 in which a correlation of an air mass LM with a throttle valve angle W is performed.

The throttle valve angle W passed from the control tract 10 to the output 11 of the motor controller 6 is then forwarded to the throttle valve 3 at which the required throttle valve angle is set by appropriate adjusting apparatus. The throttle valve angle W set at the throttle valve 3 then is able to feed the desired set amount of air $LM_{set}$ to the internal combustion engine 1. The amount of air LM fed to the internal combustion engine 1 is then measured by the air mass sensor 4, and the corresponding fuel mass KM is supplied to the internal combustion engine 1 to form the mixture, based on the operation of the air-fed motor. This fuel mass can then still be varied by the above-mentioned $\lambda$ control to achieve the desired exhaust gas values.

Because the flow conditions really prevailing in the air induction tract 2 are not always in harmony with the marginal conditions present for the recording of the second performance graph, the throttle valve angle W that has been determined might not result in the desired set air mass $LM_{set}$. Moreover, the relationship between torque and air mass in the first performance graph 12 is additionally dependent upon the fuel mass KM delivered for combustion which, as shown, is subject to the $\lambda$ control. Therefore, a slight departure of the actual air mass from the set air mass due to the $\lambda$ control entails a slight change in the fuel mass KM expected for the set air mass, which then leads to a marked change in the actual torque that is achieved.

Furthermore, the air mass sensor 4 is exposed in the course of time to dirt and wear. As a result, the air mass value detected by it regularly results in a fuel mass KM inappropriate for the torque and for the exhaust gas composition.

According to the present invention, the motor controller 6 is allowed to recognize when the internal combustion engine 1 is in a steady or quasi steady running state by scanning of various marginal conditions which, if the motor controller 6 is so equipped, permit the conclusion that the internal combustion engine 1 is in a steady or virtually steady state of operation. Examples of marginal conditions include: the rotary speed of the motor is constant over a long period of time; a predetermined $\lambda$ value is present (e.g., $\lambda=1$, which corresponds to stoichiometric combustion) over a long period of time, the presence of certain values of the blocking period, or exhaust gas feedback.

If the motor controller 6 detects the presence of such steady-state operation, in a first stage 15 the actual air mass $LM_{actual}$ is determined. The term "stage" in this case refers to a step in the process according to the invention for setting the torque. These stages can be contained in the motor controller as circuits on a circuit board or parts of the program of a computer.

First the fuel mass KM which is fed by the fuel injection system 5 to the combustion chambers is communicated to the first stage 15. It is not necessary, as in the illustrated embodiment, for a corresponding signal value to be transmitted by the fuel injection system 5 to the first stage 15, and likewise the corresponding data may be already contained in the motor controller. Also, the first stage 15 receives the actual $\lambda$ value from the $\lambda$ probe 8. No separate signal line is needed for this, however, because the $\lambda$ value has for example already been transmitted to the motor controller 6 in the course of the $\lambda$ control.

When the kind of fuel used by the internal combustion engine 1 is known, the actual air mass can be determined from the fuel mass and the fuel/air mass ratio of the mixture fed to the internal combustion engine 1 which can be determined from the λ value. The actual air mass $LM_{actual}$ is thereupon communicated to a second stage 16 in which a comparison of the actual and set values of the air mass is performed. For this purpose the control unit or tract 10 carries the value of the set air mass $LM_{set}$, stored in the buffer memory 13, to the second stage 16.

The result of this comparison is fed to a third stage 17 in which the determination of a suitable correction value K is then performed. The correction value K obtained in this manner then serves for the adaptation of the control tract 10. This adaptation of the control path or track 10 produces a lasting change or correction of the association between the torque $M_{set}$ entering the control path 10 and the throttle valve angle W issued by the control path 10. Preferably, in the control path 10 the value of the air mass $LM_{set}$ that is fed to the second performance graph 14 is changed.

Also in other states of operation and in the case of other set torques an adapted correlation of a throttle valve angle W is performed on the basis of the adaptation of the control path 10 according to the invention. In this manner, for example, differences between the actual marginal conditions in the operation of the internal combustion engine 1 and the marginal conditions that were present when the second performance graph 14 was recorded are eliminated. Moreover, contamination and wear of the air mass sensor 4 can thereby be compensated. Thus the overall required costs of establishing, for example, a desired torque and a desired exhaust gas composition, are reduced. Also, the time required for actuation of the control is shortened, so that the purpose of the control can be achieved more quickly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for setting torque of an internal combustion engine, comprising the steps of
   (a) performing in a control path a correlation of a torque with an air mass and of an air mass with a throttle valve position, wherein a set air mass is determined by the control path from a set torque and, a corresponding throttle valve position is determined and set;
   (b) determining an actual air mass to be delivered to the internal combustion engine for combustion;
   (c) determining any difference between the set air mass and the actual air mass by a comparison of the set and actual air mass value;
   (d) determining a correction value for the determined difference in step (c) using the correction value to perform an adaptation of the control path to the determined difference such that in the control path a throttle valve position is associated with a set torque to be established which compensates for the previously determined difference between the set air mass and the actual air mass, and
   (e) using an actual fuel mass fed to the internal combustion engine for combustion and a fuel/air mass ratio of a mixture fed to the internal combustion engine for combustion in order to determine the actual air mass.

2. The method according to claim 1, wherein the fuel/air mass ratio of the mixture used in step (e) is determined with signal values of a sensor.

3. The method according to claim 2, wherein the sensor is a λ probe, in an exhaust tract of the internal combustion engine for analyzing composition of exhaust gases from the internal combustion engine.

4. The method according to claim 1, wherein the fuel mass used in step (e) is determined with parameters of a fuel injection system.

5. The method according to claim 4, wherein the parameters are the injection duration and/or the injection pressure.

6. The method according to claim 1, further comprising the step of providing an operative cooperation between the internal combustion engine and a λ control to establish a given exhaust gas composition controlling and regulating the fuel/air mass ratio in the mixture, and the λ control changes the fuel/air mass ratio of the mixture in order to vary the exhaust gas composition by causing corresponding adaptations of the fuel mass fed to the internal combustion engine, the λ control having a λ probe for determining the fuel/air mass ratio, and the fuel/air mass ratio determined by this λ probe serving for the determination of the actual air mass for the comparison of the actual and set air mass values.

7. The method according to claim 1, wherein the determination of the actual air mass in step (b) takes place in the event of a stoichiometric combustion of the air mass and fuel mass fed to the internal combustion engine.

8. The method according to claim 1, wherein the determination of the actual air mass in step (b) takes place in the event of a steady or quasi-steady state of operation of the internal combustion engine.

9. The method according to claim 1, wherein, with an air mass sensor in an air intake tract of the internal combustion engine, an additional air mass is measured and, by a comparison of the measured additional air mass with the actual air mass determined from the fuel mass and the fuel/air mass ratio, a diagnosis of the air intake tract and/or air mass sensor is performed.

10. The method according to claim 1, wherein a value of the actual air mass is computed from the fuel mass and the fuel/air mass value, and represents the actual air mass for the comparison of the set and actual air mass values in step (c).

11. The method according to claim 1, wherein to determine the actual air mass, in step (b) an air mass value is measured with an air mass sensor, and a reference air mass value is computed from the fuel mass and the fuel/air mass ratio, then the measured air mass value is corrected with the aid of the computed reference air mass value, and finally an actual air mass value is formed which represents the actual air mass for the comparison of the actual and set values in step (c).

12. The method according to claim 1, wherein the air mass sensor is disposed ahead of a throttle valve in the air intake tract.

13. The method according to claim 12, wherein, with an air mass sensor in an air intake tract of the internal combustion engine, an additional air mass is measured and, by a comparison of the measured additional air mass with the actual air mass determined from the fuel mass and the fuel/air mass ratio, a diagnosis of the air intake tract and/or air mass sensor is performed.

14. The method according to claim 12, wherein to determine the actual air mass, in step (b) an air mass value is measured with an air mass sensor, and a reference air mass value is computed from the fuel mass and the fuel/air mass ratio, then the measured air mass value is corrected with the aid of the computed reference air mass value, and finally an actual air mass value is formed which represents the actual air mass for the comparison of the actual and set values in step (c).

15. The method according to claim 9, wherein the air mass sensor is a heat wire or hot film air mass meter.

16. The method according to claim 11, wherein the air mass sensor is a heat wire or hot film air mass meter.

17. The method according to claim 12, wherein the air mass sensor is a heat wire or hot film air mass meter.

* * * * *